Jan. 19, 1937. W. E. JAQUITH 2,068,140
SEPTIC TANK
Filed March 2, 1934
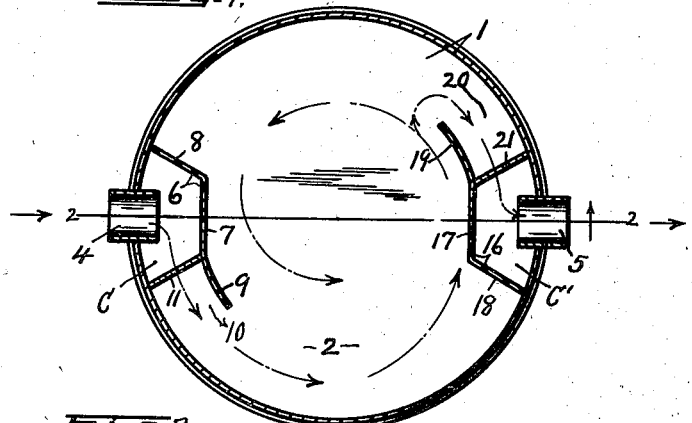
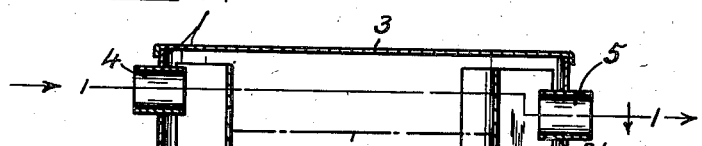
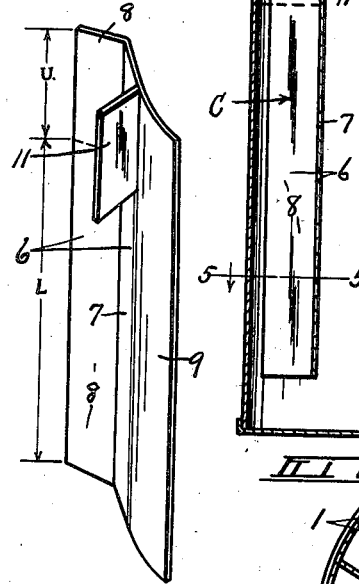
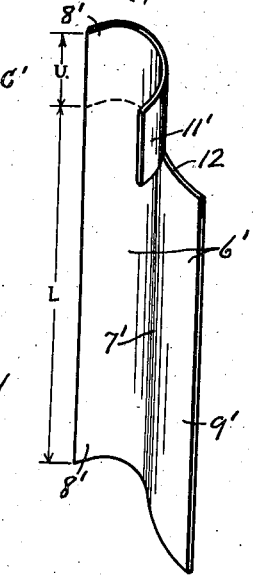
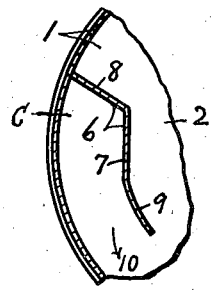
WITNESS
J. J. Mains
INVENTOR
W. E. Jaquith
by
Hoguet & Neary
ATTORNEYS Patented Jan. 19, 1937

2,068,140

UNITED STATES PATENT OFFICE 2,068,140

SEPTIC TANK

Willard E. Jaquith, Syracuse, N. Y.

Application March 2, 1934, Serial No. 713,707

6 Claims. (Cl. 210—6)

This invention relates to an upright cylindrical septic tank preferably of sheet metal and adapted to receive sewage from the waste pipes of suburban homes and other buildings for reducing the solids thereof to a liquid state through bacteria action, thus improving the nature of the sewage and making the final disposal easier and safer.

In apparatus of this character, it is desirable that the inlet and outlet openings shall be arranged in diametrically opposite sides of the tank near the top thereof with the outlet slightly lower than the inlet so as to maintain a relatively large body of the sewage therein to the level of the outlet and allow the liquefied content to readily pass through the outlet to the soil.

It is also desirable to provide some means for preventing the direct horizontal flow of the inflowing sewage from the inlet to the outlet and also to further retard and direct the flow of the material through the tank in such manner as to expedite the formation of a bacteria mat on the surface of the liquid through the flotation of the liquefied solids resulting from putrefaction thereof, and thereby to encourage the development of the necessary bacteria for the complete disintegration and liquefaction of the solid matter so that the liquid escaping through the outlet to the soil will be as clear as possible from suspended solids of organic matter.

The main object of the present invention is to cause the sewage to flow through the tank with a slow eddying motion and thereby to assure a more expeditious formation and even distribution of the mat on the surface of the sewage and resultant more complete disintegration and liquefaction of a greater quantity of the solids than has heretofore been practised in tanks of this character.

Another object is to cause the sewage to travel circumferentially around and within the tank against the upright side walls thereof with a sluggish but continuous eddying motion so that the bacteria may act upon the entire body of sewage in transit from the inlet to the outlet.

Another object is to provide the interior of the tank with simple and efficient means for effecting this eddying or spiral motion of the sewage without interrupting its motion.

Other objects and uses will be brought out in the following description.

In the drawing:—

Figure 1 is a horizontal sectional view of my improved septic tank taken in the plane of line 1—1, Figure 2.

Figure 2 is a vertical sectional view of the same tank taken in the plane of line 2—2, Figure 1.

Figure 3 is a perspective view of one of the combined baffle and deflecting plates shown in Figures 1 and 2.

Figure 4 is a perspective view of a modified form of combined baffle and deflecting plate.

Figure 5 is a detail horizontal sectional view taken on line 5—5, Figure 3.

As illustrated, this septic tank which is adapted to be installed in an opening of corresponding size in the ground comprises a cylindrical upright tubular shell 1 having a bottom wall 2 and a top wall 3 normally closing the corresponding ends of the tubular upright shell 1 which is provided near its upper end with diametrically opposite inlet and outlet openings 4 and 5 arranged with the outlet at a level somewhat below the inlet.

The inlet opening 4 is adapted to be connected to the waste pipe or pipes of a house or other building for receiving the sewage therefrom and delivering the same into the interior of the tank while the outlet opening 5 is adapted to be connected to any suitable pipe distributing system also imbedded in the soil for delivering the sewage thereto, said outlet opening also serving to maintain the sewage entering the tank at a predetermined level and incidentally allowing the tank to retain a relatively large body of the sewage to be acted upon by the bacteria developed therein for reducing the effluent to a free flowing liquid state.

Suitable means is provided whereby the inflowing sewage will be deflected downwardly and circumferentially with a spiral motion about the axis of the tank to not only prevent the passage of the sewage in a direct line between the inlet and outlet of the tank but also to impart to the entire body of sewage a relatively slow and continuous eddying or spiral motion about said axis.

For this purpose, I have provided what may be termed a combined baffle and deflector plate 6 of substantially L-shaped cross section extending vertically across the inner end of the inlet 4 in spaced relation thereto and preferably in parallel relation to the adjacent side of the tank so as to deflect the inflowing sewage downwardly and thus prevent the passage of the sewage in a direct line between the inlet and outlet.

This plate 6 extends vertically within and the greater portion of the height of the tank from a level just above the inlet 4 and below the top wall 3 to a level some distance above the bottom of the tank and comprises a substantially flat central portion 7 and wings 8 and 9 projecting laterally from the opposite upright edges of said central portion beyond opposite sides of the inlet 4 to form what may be termed a baffle wing and a deflector wing respectively for purposes presently described.

The baffle wing 8 projects outwardly from the central portion 7 at an obtuse angle thereto and has its outer upright edge welded or otherwise secured to the adjacent upright wall of the tank to form a liquid-tight joint therewith and thereby to prevent the circulation of the inflowing sewage in that direction.

The deflecting wing 9 extends circumferentially from the central portion 7 a distance approximately equal to the width of the wing 8 and is preferably curved transversely about the axis of the tank and arranged in parallel spaced relation to the adjacent upright wall thereof to form an intervening passage 10 extending from top to bottom of the plate and thereby to allow the inflowing sewage to be deflected circumferentially around and against the peripheral walls of the tank with a spiral eddying motion and incidentally imparting a relatively slow eddying motion to the entire body of sewage within said tank.

The purpose of producing this slow eddying motion is to not only assist in breaking up the sludge which tends to settle upon the bottom and sides of the tank, but also to afford ample time for the bacterial reduction of the entire body of sewage to the desired effluent state without interruption in transit from the inlet to the outlet of the tank.

As a further means for preventing the passage of the inflowing sewage in a direct line from the inlet 4 to the outlet 5, the upper end of the plate 6 is provided with a relatively short baffle wing 11 welded or otherwise rigidly secured thereto near the junction of the curved wing 9 with the central portion 7 to project outwardly therefrom and has its outer edge welded or otherwise secured to the adjacent wall of the tank 1 at the side of the inlet opposite the wing 8.

This wing 11 extends downwardly from the top of the plate 6 some distance below the level of the sewage and mat thereon and therefore below the levels of the inlet 4 and outlet 5, but terminates at its lower end a considerable distance above the bottom of said plate so that the wing 11 and upper end of the plate constitute what may be termed a U-shaped baffle member in the path of the inflowing sewage for directing the same downwardly between the plate 6 and adjacent upright wall of the tank to be again deflected circumferentially through the passage 10 for imparting the desired eddying motion to practically the entire body of sewage within the tank.

In Figure 5, I have shown a combined baffle and deflector plate 6' of substantially the same cross sectional form and size as that shown in Figures 1 to 4 inclusive except that its upper end is arcuate instead of angular and is provided with an integral baffle wing 11' which is first formed as a continuation of the deflector wing 9' and then separated therefrom by a transverse slit 12 after which it is bent laterally or outwardly in opposed relation to the opposite wing 8' to form what may be termed a U-shaped baffle member.

An additional baffle and deflector plate 16 identical with either of the plates 6 or 6' is arranged in reverse order within the tank with its upper U-shaped baffle member extended across the inner end of the outlet 5 in spaced relation thereto and its remaining portion extended downwardly therefrom so that its upper and lower ends will be disposed at about the same levels as the corresponding ends of the plate 6 or 6'.

That is, the plate 16 is provided with upright baffle wings 18 and 21 projecting in opposite directions from a central upright portion 17 and corresponding to the wings 8 and 11, Figure 3, or 8' and 11', Figure 4, the outer edges of said wings being welded or otherwise secured to the adjacent peripheral walls of the tank 1 to form liquid-tight joints therewith.

This plate 16 is also provided with a laterally curved deflector wing 19 corresponding to the wing 9, Figure 3 or 9' Figure 4, except that it extends circumferentially in the opposite direction to assist in continuing the eddying motion of the main body of the sewage about the axis of the tank.

The vertical height of the wings 18 corresponds to that of the wing 8, Figure 3, or 8', Figure 4, while the height of the deflector wing 19 may correspond to that shown in Figure 3 or Figure 4, said wing 19 being concentric with the axis of and in spaced relation to the peripheral wall of the tank to form an intervening passage 20 for the sewage around the free edge thereof to the outlet chamber.

It will now be understood that the spaces between the plates 6 and 16 and the adjacent sides of the tank 1 constitute respectively a sewage inlet chamber C and a sewage outlet chamber C' and that the plate 6 serves to deflect the inflowing sewage downwardly and circumferentially in one direction for producing the desired eddying motion of the main body of sewage within the tank while the plate 16 serves to continue the deflection of the sewage circumferentially in the same direction for maintaining such eddying motion and thus permitting the reduction of the raw sewage to the proper condition for safe delivery through the outlet to the soil.

*Operation*

The sewage coming from the source of supply and passing through the inlet opening 4 comes in direct contact with the baffle plate 6, Figure 3, or 6', Figure 4, and is thereby deflected downwardly along the plate 9 or 9' to the bottom of the tank from which it rises to the level of the bottom of the overflow outlet 5 to maintain a corresponding level of the liquid in the tank.

After the tank has been filled to the predetermined level, the continued flow of the sewage into the tank through the inlet 4 creates a downward current allowing the heavier matter such as the solids to drop to the bottom of the tank as sludge while other portions below the level of the lower end of the proximal wing 11, Figure 1, or 11', Figure 5, are deflected circumferentially by the wing 9 or 9' against the inner walls of the shell 1, thereby producing a circumferential eddying movement of the main body of the sewage around the axis of the tank.

Then, as this eddying current continues, it encounters the proximal wall 18 of the baffle plate 16 and is thereby again deflected circumferentially in the same direction aided by the inwardly curved wing 19.

This continued circumferential motion, being slow and sluggish, causes the greater bulk of the sewage within the tank between the baffle plates to circulate with a slow eddying motion along a relatively long path of travel about the axis of the tank and allows ample time for the precipitation of the solids which then undergo more or less rapid putrefaction aided by the bacteria action resulting in the disintegration and liquefaction of the solids and also allows the flotation of the lighter material to the surface to form what is commonly known as the bacteria mat between the plates 6 and 16 as shown by dotted lines in Figure 2.

This action upon the sewage is continuous and automatic and is more expeditious and efficient than has heretofore been practised by reason of the eddying motion and resultant long distance of travel of the greater bulk of the sewage within the tank in transit from the inlet opening 4 to the outlet opening 5 which facilitates uninterrupted precipitation, putrefaction and disintegration of the solids of the sewage and results in an improved and safer effluent discharged from the outlet of the tank.

What I claim is:

1. In a septic tank for sewage disposal comprising an upright receptacle, said receptacle having an inlet opening and an outlet opening near the top thereof, said outlet opening determining the level of the sewage in said receptacle, a deflector plate secured to the side walls of the receptacle adjacent the inlet opening, said plate having a surface extending at one side of the inlet opening from above the maximum surface level of the sewage substantially to the bottom of the receptacle and a surface facing the inlet opening which is free from sharp corners in which sewage may lodge and which extends from above the maximum surface level of the sewage substantially to the bottom of the receptacle and a surface on the other side of the inlet opening which extends from above the maximum surface level of the sewage and downward toward the bottom of the receptacle a distance substantially less than said first two mentioned surfaces, said deflector plate causing the incoming sewage to be deflected downward well below the surface of the sewage and beneath the lower edge of said last mentioned deflector plate surface and in one circulatory direction around the side walls of the receptacle toward the outlet opening.

2. In a septic tank for sewage disposal comprising an upright receptacle, said receptacle having an inlet opening and an outlet opening near the top thereof, said outlet opening determining the level of the sewage in said receptacle, a deflector plate secured to the side walls of the receptacle adjacent the inlet opening, said plate having a surface extending at one side of the inlet opening from above the maximum surface level of the sewage substantially to the bottom of the receptacle and a surface facing the inlet opening which is free from sharp corners in which sewage may lodge and which extends from above the maximum surface level of the sewage substantially to the bottom of the receptacle and a surface on the other side of the inlet opening which extends from above the maximum surface level of the sewage and downward toward the bottom of the receptacle a distance substantially less than said first two mentioned surfaces, said deflector plate causing the incoming sewage to be deflected downward well below the surface of the sewage and beneath the lower edge of said last mentioned deflector plate surface and in one circulatory direction around the side walls of the receptacle toward the outlet opening, and a guide plate secured to said deflector plate for aiding in directing the sewage in its circulatory movement, said guide plate extending substantially parallel to the side walls of the receptacle from substantially the bottom of the receptacle to substantially the surface of the sewage.

3. In a septic tank for sewage disposal comprising an upright receptacle, said receptacle having an inlet opening and an outlet opening near the top thereof, said outlet opening determining the level of the sewage in said receptacle, a deflector plate secured to the side walls of the receptacle adjacent the inlet opening, said plate having a surface extending at one side of the inlet opening from above the maximum surface level of the sewage substantially to the bottom of the receptacle and a surface facing the inlet opening which is free from sharp corners in which sewage may lodge and which extends from above the maximum surface level of the sewage substantially to the bottom of the receptacle and a surface on the other side of the inlet opening which extends from above the maximum surface level of the sewage and downward toward the bottom of the receptacle a distance substantially less than said first two mentioned surfaces, said deflector plate causing the incoming sewage to be deflected downward well below the surface of the sewage and beneath the lower edge of said last mentioned deflector plate surface and in one circulatory direction around the side walls of the receptacle toward the outlet opening, and a deflector plate similar to said first deflector plate disposed adjacent the outlet opening.

4. In a septic tank for sewage disposal comprising an upright receptacle, said receptacle having an inlet opening and an outlet opening near the top thereof, said outlet opening determining the level of the sewage in said receptacle, a deflector plate secured to the side walls of the receptacle adjacent the inlet opening, said plate having a surface extending at one side of the inlet opening from above the maximum surface level of the sewage substantially to the bottom of the receptacle and a surface facing the inlet opening which is free from sharp corners in which sewage may lodge and which extends from above the maximum surface level of the sewage substantially to the bottom of the receptacle and a surface on the other side of the inlet opening which extends from above the maximum surface level of the sewage and downward toward the bottom of the receptacle a distance substantially less than said first two mentioned surfaces, said deflector plate causing the incoming sewage to be deflected downward well below the surface of the sewage and beneath the lower edge of said last mentioned deflector plate surface and in one circulatory direction around the side walls of the receptacle toward the outlet opening, and a deflector plate similar to said first deflector plate disposed adjacent the outlet opening, said second deflector plate having the surface thereof corresponding to the third mentioned surface of said first deflector plate disposed in a position such that the sewage in moving toward the outlet opening is forced to travel beyond said second mentioned deflector plate and reverse its direction of flow before it can reach said outlet opening.

5. In a septic tank for sewage disposal comprising an upright receptacle, said receptacle having an inlet opening and an outlet opening near the top thereof, said outlet opening determining the level of the sewage in said receptacle, a deflector plate secured to the side walls of the receptacle adjacent the inlet opening, said plate having a surface extending at one side of the inlet opening from above the maximum surface level of the sewage substantially to the bottom of the receptacle and a surface facing the inlet opening which is free from sharp corners in which sewage may lodge and which extends from above the maximum surface level of the sewage substantially to the bottom of the receptacle and a surface on the other side of the inlet opening which extends from above the maximum surface level of the sewage and downward toward the bottom of the receptacle a distance substantially less than said first two mentioned surfaces, said deflector plate causing the incoming sewage to be deflected downward well below the surface of the sewage and beneath the lower edge of said last mentioned deflector plate surface and in one circulatory direction around the side walls of the receptacle toward the outlet opening, and a deflector plate similar to said first deflector plate disposed adjacent the outlet opening, said second deflector plate having the surface thereof corresponding to the third mentioned surface of said first deflector plate disposed in a position such that the sewage in moving toward the outlet opening is forced to travel beyond said second mentioned deflector plate and reverse its direction of flow before it can reach said outlet opening, and each of said deflector plates having a guide plate extending therefrom for directing the flow of sewage around the receptacle.

6. In a septic tank for sewage disposal comprising an upright receptacle, said receptacle having an inlet opening and an outlet opening near the top thereof, said outlet opening determining the level of the sewage in the receptacle, a deflector plate secured to the side walls of the receptacle and surrounding the space around the inlet opening at the level thereof, said deflector plate extending above the maximum level of the sewage in the receptacle and extending downward below the level of the inlet opening, said deflector plate having an opening therein for the passage of sewage into the main body of the receptacle and being so constructed and arranged as to cause the sewage to circulate around the receptacle in one direction toward the outlet opening, a deflector plate at the outlet opening extending above the maximum level of the sewage in the receptacle, said deflector plate being so constructed and arranged that a portion of the sewage may flow toward the outlet opening while the remainder continues its circulatory movement in the receptacle, the center of the receptacle throughout substantially half its diameter being devoid of deflecting means of any kind whereby the sewage may freely circulate in that portion of the receptacle.

WILLARD E. JAQUITH.